United States Patent [19]
Wixey et al.

[11] Patent Number: 5,595,124
[45] Date of Patent: Jan. 21, 1997

[54] RESTRAINING MECHANISM

[75] Inventors: Barry D. Wixey, Pittsburgh; Jeffrey L. Haffely, Gibsonia, both of Pa.

[73] Assignee: Delta International Machinery Corp., Pittsburgh, Pa.

[21] Appl. No.: 255,420

[22] Filed: Jun. 8, 1994

[51] Int. Cl.$^6$ .................................................. A47B 35/00
[52] U.S. Cl. ............................ 108/50; 108/22; 83/471.3
[58] Field of Search ................................. 83/471.3, 477.1, 83/581; 269/290, 59, 57; 30/519; 108/22, 94; 248/664

[56] References Cited

U.S. PATENT DOCUMENTS

| | | |
|---|---|---|
| 766,791 | 8/1904 | Richards . |
| 1,203,417 | 10/1916 | Schade et al. . |
| 1,866,888 | 7/1932 | Hawley . |
| 1,952,518 | 3/1934 | Stowell . |
| 2,589,554 | 3/1952 | Killian . |
| 3,570,564 | 3/1971 | Bergier . |
| 3,672,251 | 6/1972 | Jagers . |
| 3,998,121 | 12/1976 | Bennet ................................ 83/471.3 |
| 4,011,782 | 3/1977 | Clark et al. . |
| 4,527,453 | 7/1985 | van Hauten . |
| 5,060,548 | 10/1991 | Sato et al. . |
| 5,189,937 | 3/1993 | Garuglieri . |
| 5,216,964 | 6/1993 | Sato et al. ............................ 83/471.3 |
| 5,249,496 | 10/1993 | Hirsch et al. ......................... 83/471.3 |
| 5,347,902 | 9/1994 | Brickner et al. ................... 83/471.3 X |
| 5,383,382 | 1/1995 | Garuglieri et al. .................... 83/471.3 |

OTHER PUBLICATIONS

Delta Specialty Saws product pamphlet not dated.

*Primary Examiner*—Jose V. Chen
*Attorney, Agent, or Firm*—Kirkpatrick & Lockhart LLP

[57] ABSTRACT

A restraining mechanism of an adjustable work table is disclosed for releasably restraining movement of a movable member of the table relative to a stationary member of the table. The restraining mechanism includes a clamping portion connected to one of the movable and stationary members, and a spring portion connected to the clamping portion for forcing the clamping means against the other of the movable and stationary members and thereby restraining movement of the movable member relative to the stationary member. The restraining mechanism further includes a pivot portion attached to the one of the movable and stationary members, and a lever arm portion, pivotably cooperating with the pivot, for contacting the clamping portion during pivotal motion of the lever arm portion and thereby operating against the bias of the spring portion to reduce the force applied through the clamping portion to the other of the movable and stationary members, to allow movement of the movable member relative to the stationary member.

25 Claims, 4 Drawing Sheets

RESTRAINING MECHANISM

BACKGROUND OF THE INVENTION

1. Field of the Invention

The present invention relates to devices useful for releasably restraining movement of a movable member relative to a stationary member. More particularly, the present invention relates to restraining mechanisms for adjustable tables.

2. Description of the Invention's Background

There are many situations where a movable member is movable relative to a stationary member. For example, in many adjustable work tables such as adjustable tool or vise tables there are often provided at least one base portion and at least one table portion which are movable relative to each other. Generally, a tool or vise is attached to one of the base and table portions. In the case of a tool, some type of workpiece guide surface is attached to the other of the base and table portions, and relative movement between the base and table portions thereby causes relative movement of the tool relative to the workpiece guide surface, and allows different positionings of the tool relative to a workpiece. For example, it is common in miter saws for base and table portions thereof to be rotatable relative to each other, and thus for the saw to be rotatable relative to workpiece guide surfaces thereof to allow miter cuts of various angles to be made with the saw.

In the case of a vise or clamp, the other of the base or table portions is fixed to a stationary object, such as a bench. Relative movement between the base and table portions then allows different positionings of a workpiece held by the vise or clamp relative to the bench.

In the situations where there is a movable member movable relative to a stationary member, it is often desirable to releasably restrain relative movement of the movable and stationary members. Thus, for example, in a miter saw, some mechanism for releasably restraining relative movement of the base and table portions is desirable, to hold the saw and the workpiece guide surfaces fixed relative to each other during cutting of a workpiece.

Many mechanisms have been proposed to effect such releasable restraint. For example, U.S. Pat. No. 4,011,782 to Clark, et al., discloses a locking and detenting portion for a power miter saw which includes a trigger latch member mounted on a swinging lever, which trigger pivots about a pin and includes a detent lug. A compression spring biases the trigger to urge the detent lug into any one of a number of recesses in a base front flange portion. A handle is additionally provided which can be threaded inwardly to force a vertical flange of a plate against the flange portion to secure the saw at angles other than and between those determined by the recesses 128.

There are several disadvantages to the arrangement described in the Clark, et al. patent. First, the trigger is only effective to latch a saw at certain preset angles. It does not provide a continuous range of angles at which the saw may be set. The handle provides such a continuous range, but requires that an operator must supply the force to frictionally secure a saw at a particular angle. The handle thus has the disadvantage that it requires an operator to supply a relatively large amount of force each time the operator wishes to secure a saw at a particular angle, and, in addition, that even the maximum amount of force which the operator can supply still results in a relatively weak frictional force, thus increasing the risk that the saw will move relative to a workpiece during a cutting operation.

Other devices are known which include the same disadvantages as the handle of the Clark, et al. patent. For example, FIG. 9 of U.S. Pat. No. 5,060,548 to Sato, et al. illustrates a grip which is mounted to a rotatable turntable and which is threadable into frictional engagement with a side of a base, to thereby restrict rotation of the turntable. U.S. Pat. No. 4,527,453 to van Hauten discloses means to fix a saw table and saw unit relative to a fence, which includes bolts mounted in the fence. The bolts include sloped annular shoulders which mate with sloped annular shoulders in the fence such that turning of the bolts causes annular end faces of the bolts to be pressed against the saw table. FIGS. 6–10 of U.S. Pat. No. 5,189,937 to Garuglieri discloses a circular saw arrangement which includes a clamping lever which is rotatable to apply a load to an angular lever through a clamping bolt, and thence to the angled section of a screw bolt. The angled section thereby abuts against a projecting area of a guide-rib section of a table plate.

Each of the aforementioned devices includes a continuous range of angle settings, but requires an operator to apply a relatively large force to move a part into frictional engagement with another part. In addition, a maximum force which an operator can exert still generates only a relatively small frictional engagement force. In an apparatus that includes a high speed power tool which generates constant vibrations, it is undesirable to rely upon such a relatively weak force to prevent relative movement between a saw and a workpiece.

U.S. Pat. No. 766,791 to Richards discloses a locking mechanism for a miter saw, which includes a plug having a bearing face thereon for bearing upon a bearing face of a frame of a miter box. The plug is cut away to accommodate a rotatable rock shaft, which rock shaft is embraced by split hubs of a bow-shaped lever. The lever is biased by springs to bias the bearing faces into frictional engagement. The miter box of the Richards patent thus includes a continuous range of angle settings, and it also provides spring biasing so that an operator does not need to supply the force to frictionally engage two parts to secure the miter box at a particular angular setting. However, the frictional force supplied by the spring biasing of the Richards device still tends to be relatively weak, because the spring biasing is supplied through the same part, i.e., the lever, which an operator must move to release the frictional engagement. The larger the spring biasing force becomes, the larger the force the operator must supply to release frictional engagement. The spring biasing force can therefore not be too large or the operator will be unable to release the frictional engagement. In addition, the device of the Richards patent has the disadvantage that both spring biasing and releasing of frictional engagement are achieved through the lever, thereby through the rock shaft, and thereby through the plug, which unnecessarily increases the complexity and risk of failure of the device.

In view of the above, it is an object of the present invention to provide an improved restraining mechanism for releasably restraining movement of a movable member relative to a stationary member.

It is another object of the present invention to provide a restraining mechanism which can restrain movement of a movable member relative to a stationary member over a continuous range of relative positions of the movable and stationary members.

A further object of the present invention is to provide a restraining mechanism which does not rely upon an operator to generate a restraining force thereof.

Yet another object of the present invention is to provide a restraining mechanism that provides a relatively strong restraining force, but requires an operator to supply a relatively weak releasing force.

It is a further object of the present invention to provide a restraining mechanism which is relatively simple in operation and relatively resistant to failure.

SUMMARY OF THE INVENTION

The above objects as well as other objects not specifically enumerated are accomplished by a restraining mechanism in accordance with the present invention. A restraining mechanism of the present invention, for releasably restraining movement of a movable member of an adjustable work table relative to a stationary member of the table, includes clamping means connected to one of the movable and stationary members, and spring means, connected to the clamping means, for forcing the clamping means against the other of the movable and stationary members and thereby restraining movement of the movable member relative to the stationary member. The restraining mechanism also includes pivot means attached to the one of the movable and stationary members, and lever arm means, pivotably cooperating with the pivot means, for contacting the clamping means during pivotal motion and thereby operating against the bias of the spring means to reduce the force applied through the clamping means to the other of the movable and stationary members, to allow movement of the movable member relative to the stationary member.

The objects of the present invention are also accomplished by a restraining mechanism for an adjustable tool table for releasably retraining movement for a movable member of the table relative to a stationary member of the table, which includes clamping means connected to one of the movable and stationary members, and spring means, connected to the clamping means, for forcing the clamping means against the other of the movable and stationary members and thereby restraining movement of the movable member relative to the stationary member. The restraining mechanism also includes pivot means attached to the one of the movable and stationary members, and lever arm means, pivotably cooperating with the pivot means, for contacting the clamping means during pivotal motion and thereby operating against the bias of the spring means to reduce the force applied through the clamping means to the other of the movable and stationary member, to allow movement of the movable member relative to the stationary member.

The objects of the present invention are further accomplished by an adjustable table, which includes base means, table means, wherein the base and table means are movable relative to each other, clamping means connected to one of the base and table means, wherein the clamping means includes a clamping portion and a contact portion, and spring means in contact with the clamping means for forcing the clamping means against the other of the base and table means, to thereby restrain relative movement between the base and table means. The adjustable table also includes pivot means attached to the one of the base and table means, and lever arm means pivotably cooperating with the pivot means, for contacting the clamping means contact portion during pivotal motion of the lever arm means and thereby operating against the bias of the spring means to reduce the force applied through the clamping means to the other of the base and table means, to allow relative movement between the base and table means.

BRIEF DESCRIPTION OF THE DRAWINGS

The preferred embodiment of the present invention will be described in greater detail with reference to the accompanying drawings, wherein like members bear like reference numerals and wherein.

DETAILED DESCRIPTION OF THE PREFERRED EMBODIMENT

With reference to FIGS. 1–5, a sliding compound miter saw 100 which includes a restraining mechanism 10 in accordance with an embodiment of the present invention includes a base portion 102 and a table portion 104. The base portion 102 is normally connected to a stand or other support (not shown) such as the stand disclosed in a copending application filed on even date herewith and entitled "Flat Folding Stand or Support". The base portion 102 is thus held generally stationary, while the table portion 104 is attached to the base portion 102 by means of a pivot pin 106 which extends into a hole 108 in the base portion 102, such that the table portion 104 is rotatable in a horizontal plane relative to the base portion 102. The base portion 102, the table portion 104, and the pin 106 thus form an adjustable work table, which in the context of their use in the sliding compound miter saw 100 is an adjustable tool table. The base portion 102 thus normally forms a stationary member of the tool table and the table portion 104 normally forms a movable member of the tool table, which is movable relative to the stationary member.

Figure 1:
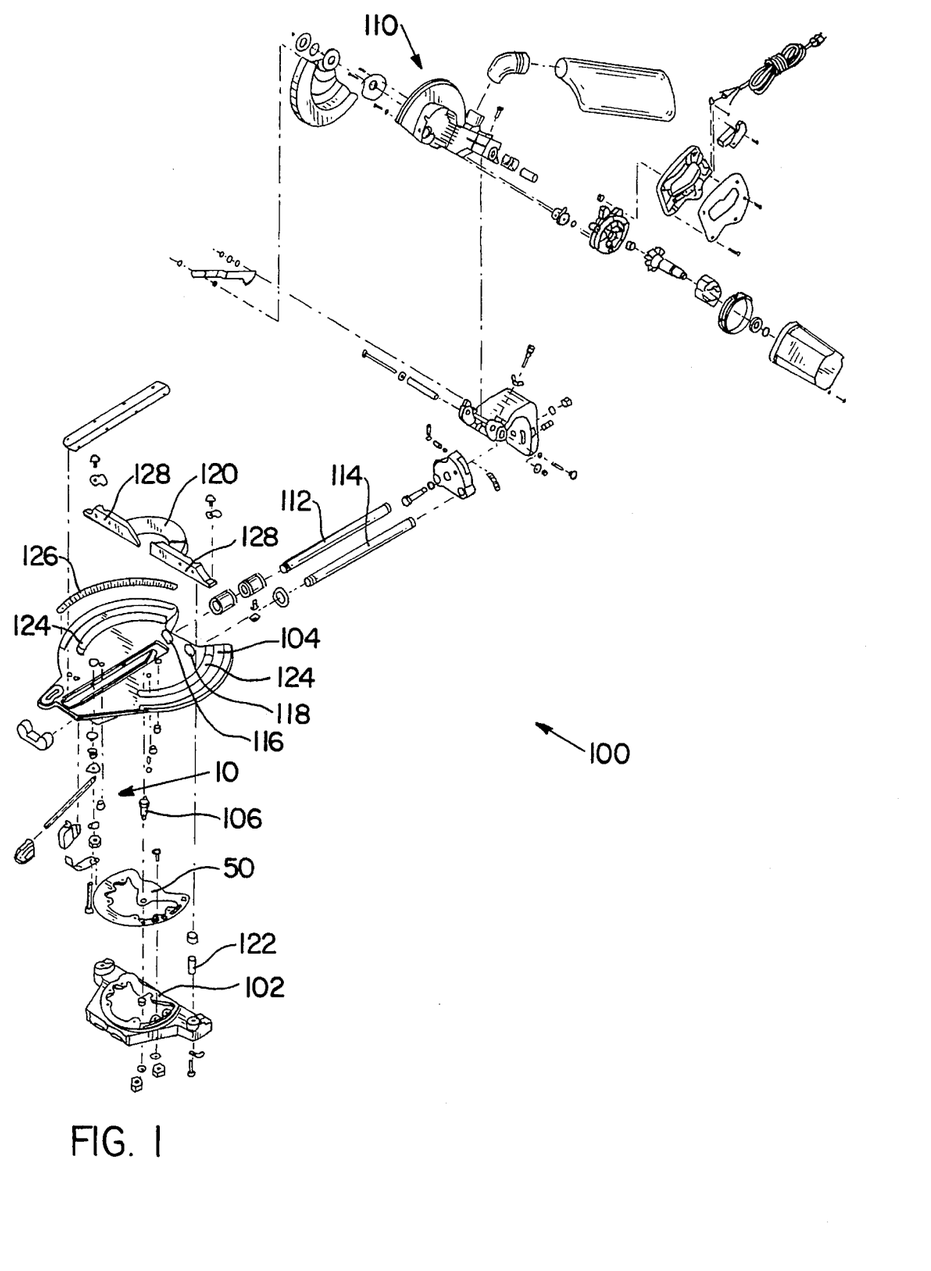
FIG. 1 is an exploded view of a sliding compound miter saw which includes a restraining mechanism of the present invention.

A saw 110 is slidably mounted to the table portion 104 by means of rods 112, 114 which slide through holes 116, 118 on an undercarriage of the table portion 104. The saw 110 is thus constrained to rotate with the table portion 104. A fence 120 is mounted to the base portion 102 by means of two posts 122, only one of which is shown. The posts 122 extend through arcuate slots 124 in the table portion, which slots 124 each extend for about 102 degrees of arc. The table portion 104 and thus the saw 110 are therefore able to rotate relative to the fence 120 over about 102 degrees of arc. A pair of arcuate scales 126, only one of which is shown, are mounted along edges of the table portion 104 such that the position of the ends of the fence 120 will indicate the angle between the front face 128 of the fence 120 and the plane of travel of a saw blade mounted in the saw 110. The scales 126 thus indicate the angle of a miter cut which the saw 110 will make on a workpiece held flush with the front face 128 of the fence 120.

Figure 2:
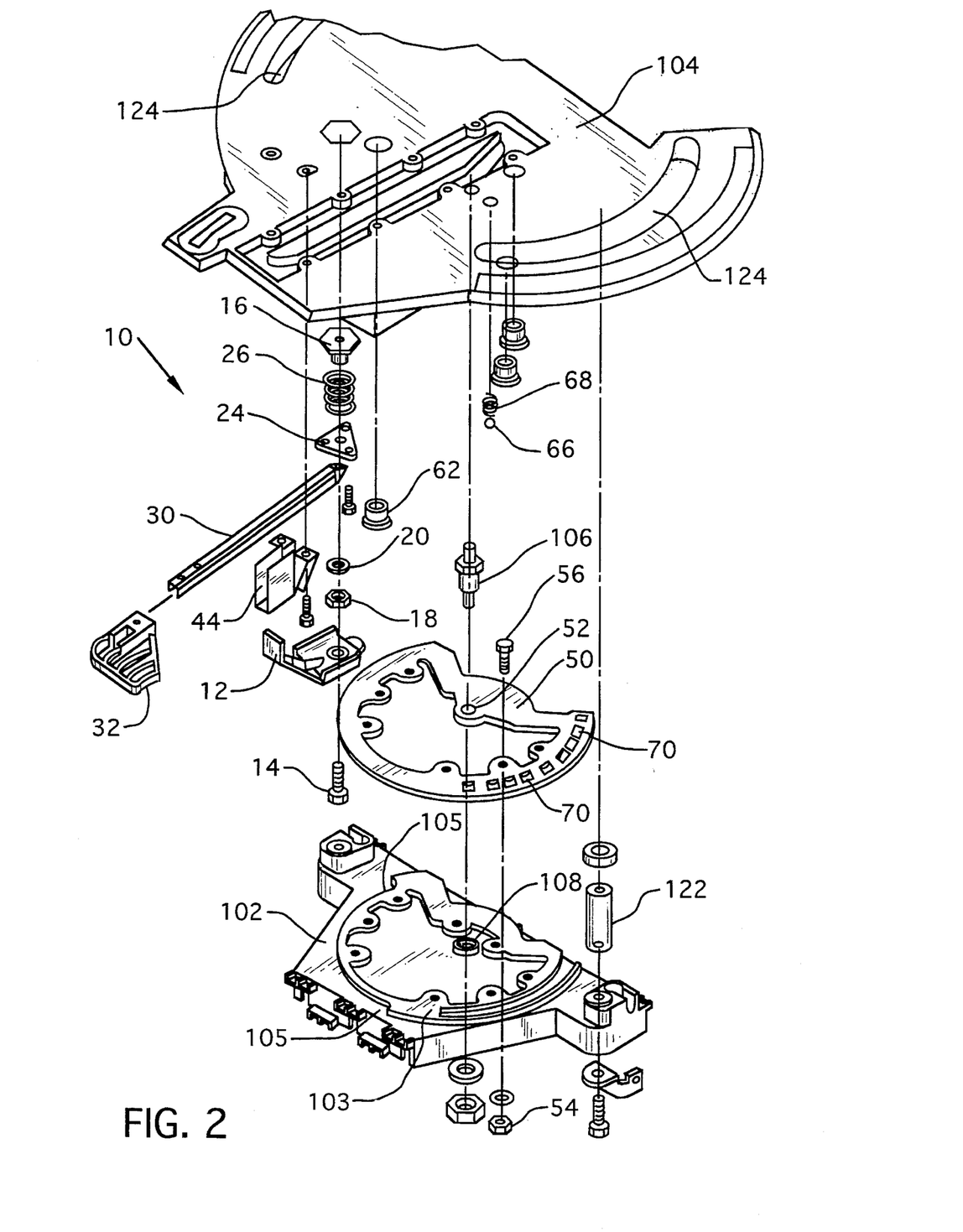
FIG. 2 is an enlarged view of a portion of FIG. 1, showing the restraining mechanism of the present invention in greater detail.
Figure 3:
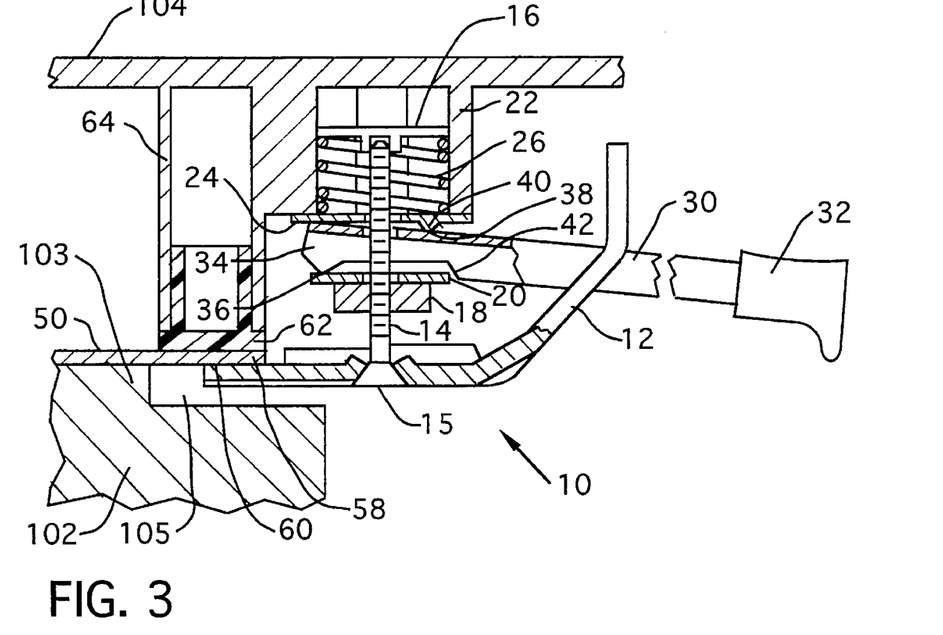
FIG. 3 is a cutaway cross sectional view of the restraining mechanism of the present invention, in a restraining position.
Figure 4:
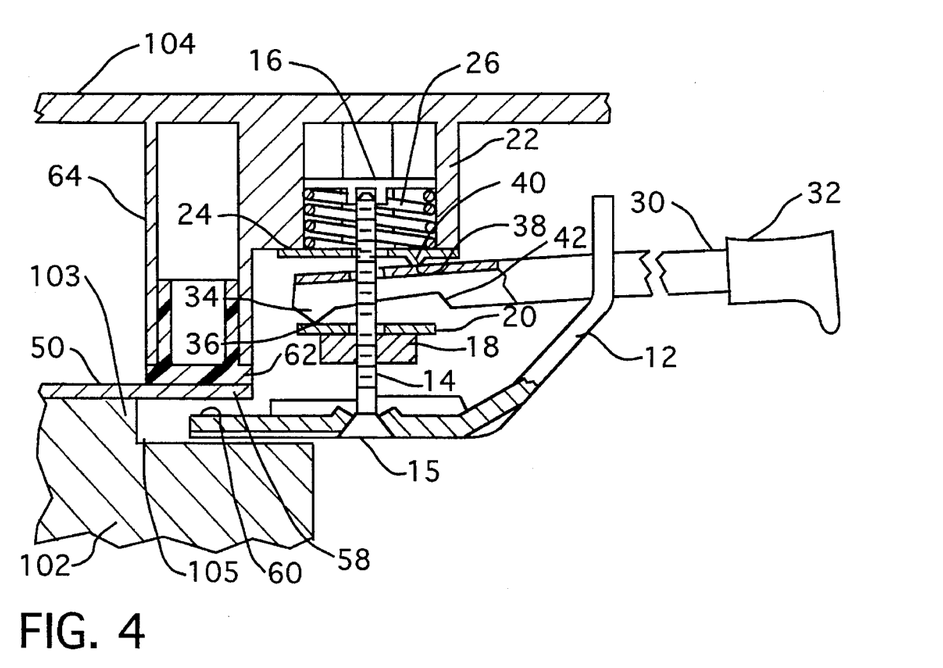
FIG. 4 is a cutaway cross sectional view similar to FIG. 3, with the restraining mechanism in a released position.

As shown in greater detail in FIGS. 2–4, the restraining mechanism 10 according to an embodiment of the present invention includes a clamping assembly which includes a strap 12, a bolt 14, a clamping nut 16, a contact nut 18, and a contact washer 20. The bolt 14 is preferably about a one-quarter inch (0.63 cm) diameter bolt, the contact washer 20 is preferably about a one-half inch (1.27 cm) diameter washer, and the contact nut 18 is preferably a locking nut. As shown in FIGS. 3 and 4, the strap 12 is slidably held on the bolt 14 and rests adjacent a head 15 of the bolt 14. The clamping nut 16 is threadably attached to the bolt 14 and is spaced from the strap 12. The contact nut 18 is also threadably attached to the bolt 14 and is spaced from the strap 12 and the clamping nut 16, while the contact washer 20 rests on top of the contact nut 18 and thus is also spaced from the strap 12 and the clamping nut 16.

Figure 5:
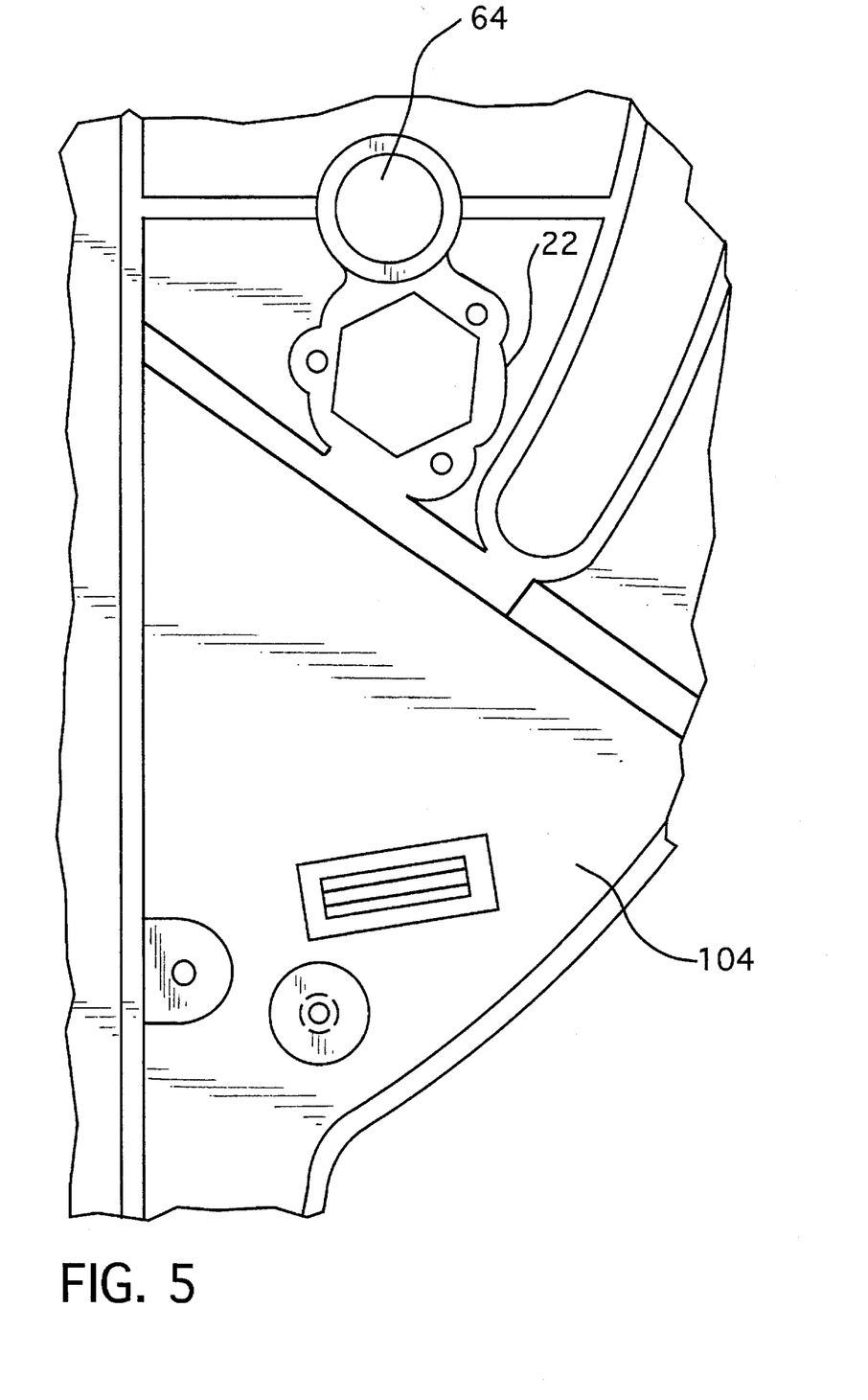
FIG. 5 is a bottom view of a portion of a table portion of the miter saw of FIG. 1.

The clamping nut 16 has a hexagonal perimeter, as seen in FIG. 2, and it fits slidably within a hollow cylindrical extension 22 of the table portion 104, which has a hexagonal internal cross section, as shown in FIG. 5. Any other mating cross-sectional shapes which will prevent rotation of the clamping nut 16, i.e., square, elliptical, etc., are equally acceptable. A plate 24 having a hole therein through which bolt 14 freely slides closes the end of the extension 22, and a spring 26 is located within the extension 22 around a portion of the bolt 14, compressed between and in contact with the clamping nut 16 and the plate 24. A lever arm 30 having a U-shaped cross-section and having a hole therein through which the bolt 14 freely slides is located between the plate 24 and the contact washer 20. As seen in FIGS. 3 and 4, the lever arm 30 includes a handle portion 32, and a contact portion 34 on each leg of the U-shape, which contact portion 34 contacts the upper face or contact portion 36 of the contact washer 20. The lever arm 30 further includes a pivot portion 38 intermediate the handle portion 32 and the contact portions 34, which rests against and pivotally cooperates with a pivot projection 40 on the plate 24. The lever arm 30 also includes a recess portion 42 on each leg of the U-shape whose purpose will be described more fully hereinbelow. A bracket 44 is mounted to the underside of the table portion 104 and encircles the lever arm 30 adjacent the handle portion 32 thereof, such that the lever arm is constrained to move in a vertical plane and pivot about the pivot projection 40. The pivot projection 40 is in the form of a half of a cylinder which extends perpendicularly to the view shown in FIGS. 3 and 4, and, if desired, the pivot portion 38 of the lever arm 30 can be formed as a semicylindrical recess in the lever arm 30, such that the pivot portion 38 extends at least partially around an outer surface of the pivot projection 40.

It is to be understood that the locations of the contact portions 34 on the legs of the lever arm 30 are not preferably in the location shown in FIGS. 3 and 4. FIGS. 3 and 4 are drawn for ease of illustration only. Preferably, the contact portions 34 are formed such that they would be immediately behind and in front of the bolt 14 as the bolt 14 is shown in FIGS. 3 and 4. In other words, the contact portions 34 would lie in a plane which runs through the central axis of the bolt 14 and which is perpendicular to the paper on which FIGS. 3 and 4 are drawn. Such an arrangement provides a more stable contact on the contact portion 36 and eliminates the possibility that the contact washer 20 will pivot about the contact portions 34 during contact therewith.

In FIGS. 3 and 4, a central portion of the lever arm 30 is broken out for convenience, and it should be appreciated that on the scale of FIGS. 3 and 4 the lever arm 30 would in fact extend a long distance. Preferably, a first distance between the pivot portion 38 and the handle portion 32 is about forty times greater than a second distance between the pivot portion 38 and the contact portion 34 of the lever arm 30. Thus, if the second distance is about one quarter of one inch (0.67 cm), then the second distance would be about ten inches (20.5 cm). The large mechanical advantage overcomes the force of the spring 26.

A thin metal wear ring 50 is centered about pin 106, which pin extends through a hole 52 in the wear ring 50. The wear ring 50 is mounted to the base portion 102 by means of a plurality of nuts 54 and bolts 56, only one of each of which is shown in FIG. 2. When the wear ring 50 is mounted to the base portion 102, it should be appreciated that it forms part of the aforementioned stationary member. The base portion 102 includes a raised portion 103 having a circumferential recess 105 therein which extends over about 102 degrees of arc. The outer edge 58 of the wear ring 50 extends over the recess 105 when the wear ring 50 is mounted to the base portion 102, as seen in FIGS. 3 and 4. A clamping portion 60 of the strap 12 extends into the recess 105 underneath the edge 58 of the wear ring 50, and a circular wear pad 62 mounted in a circular extension 64 (see FIG. 5) of the table portion 104 is located above the edge 58 of the wear ring 50 immediately above the clamping portion 60 of the strap 12. The wear pad 62 is preferably made of nylon, but can be made of any material which is relatively rigid but still relatively soft, as will be explained further hereinbelow.

The table portion 104 also has mounted thereto a detent in the form of a ball 66 which is biased downwardly toward the base portion 102 by a spring 68. The wear ring 50 includes a plurality of indented recesses 70 which are spaced along the circumference of the wear ring 50 at various predetermined locations. The ball 66 and the recesses 70 are each located a radial distance from the pin 106 such that when the sliding compound miter saw 100 is assembled the ball 66 moves along an arcuate path on the upper surface of the wear ring 50 directly across each of the recesses 70.

With reference to FIGS. 1–4, the structure and operation of the sliding compound miter saw 100 and the restraining mechanism 10 will now be explained. Normally the restraining mechanism 10 will be in a restraining position, as shown in FIG. 3, wherein it restrains relative movement of the table portion 104 relative to the base portion 102 and thus maintains the front face 128 of the fence 120 at a constant angle relative to a vertical plane in which a saw blade mounted in the miter saw 110 lies. Thus the spring 26 is compressed between the plate 24 and the clamping nut 16 such that it exerts a force on the clamping nut 16 of between about 350 and 500 pounds. The force of the spring 26 is transmitted through the bolt 14 to the strap 12 through the head of the bolt 14, and the clamping portion 60 of the strap 12 is thus forced against the underside of the wear ring 50 with a force of between about 350 and 500 pounds. To prevent the edge 58 of the wear ring 50 from being bent upwardly by the strong normal force exerted by the strap 12, the wear pad 62 is provided in the extension 64 directly above the strap 12 and is preferably only spaced about 0.060 inches (0.15 cm) from the wear ring 50 when the strap 12 is not forced against the wear ring 50. The wear ring 50 is thus normally held frictionally between the strap 12 and the wear pad 62 when the strap 12 is forced against the wear ring 50. The actual frictional force exerted upon the wear ring 50 will of course depend on the particular materials of which the strap 12 and the wear ring 50 are made, but, because the normal force exerted by the strap 12 is so high, the frictional force will be substantial for normal materials, i.e., for metals.

The contact nut 18 and thus the contact washer 20 are located on the bolt 14 such that they hold the lever arm 30 against the plate 24, i.e., such that the lever arm 30 is pivoted by the force of the spring 26 in a clockwise direction about the pivot projection 40. The clockwise motion is restrained by the strip 12 forcing the edge 58 at wear ring 50 into engagement with the pad 62. It can be seen from FIG. 3 that the recessed portion 42 of the lever arm 30 is necessary in this position to prevent unwanted contact between the contact washer 20 and the lever arm 30.

When an operator of the sliding compound miter saw 100 wants to change the angular orientation between the fence 120 and a plane in which a saw blade mounted on the miter saw 110 moves, the operator simply pulls upwardly on the handle portion 32 of the lever arm 30 such that the lever arm pivots counterclockwise about the pivot projection 40 and thus moves to the position shown in FIG. 4. The contact portion 34 of the lever arm 30 contacts the contact portion 36 of the contact washer 20 and pushes the clamping assembly downwardly, relieving the strap 12 and the wear ring 50 of the compressive force of the spring 26. The operator is then free to rotate the table portion 104 to a different angular orientation, as indicated on the scales 126. Because the recess 105 into which the clamping portion 60 of the strap 12 extends includes 102 degrees of arc, the table portion 104 can be rotated within a continuous 102 degree range of angular orientations. Because the wear pad 62 is fixed to the table portion 104, it always remains just above the strap 12. As mentioned above, it is therefore important that the wear pad 62 be made of a material which is relatively rigid, so that the wear pad 62 can support the wear ring 50. It is also important that the material be relatively soft, so that it wears on the wear ring 50 as little as possible during rotation of the table portion 104. Nylon is a preferred material, but other plastics are also usable.

Once the operator has rotated the table portion 104 to a desired angular orientation, he need only release the lever arm 30. The spring 26 will then expand and push the clamping nut 16 and the rest of the clamping assembly upwardly, which will force the strap 12 back against the wear ring 50 and will force the lever arm 30 back into the position shown in FIG. 3.

As stated above, the ball 66 moves in an arcuate path along the upper surface of the wear ring 50 directly across each of the recesses 70 as the table is rotated. Because the ball 66 is biased downwardly by the spring 68, the ball 66 is spring-biased into each recess 70 as it moves along the arcuate path. When the ball 66 clicks into a particular recess 70, the operator knows that the table portion 104 is at a predetermined, often-used angular position relative to the fence 120, such as 30 or 45 degrees. The detent ball 66 thus provides an extra, easy-to-use confirmation of the angular orientation of the table portion 104 at more commonly used angles. The table can, however, be set at any angle.

It should be understood that although in FIG. 4 the strap 12 is shown as being spaced from the wear ring 50 when the lever arm 30 is in the counterclockwise position, the lever arm 30 may pivot only enough to release most of the compressive force of the spring 26 from the strap 12, such that the force applied through the clamping portion 60 to the wear ring 50 is reduced and only a small frictional force is generated between the strap 12 and the wear ring 50 when the operator rotates the table portion 104. In such a case, wherein the contact portion 34 of the lever arm 30 moves only about 0.015–0.020 inches (0.04 to 0.05 cm), there will never truly be a space between the strap 12 and the wear ring 50 during pivoting of the lever arm 30, there will only be a reduction in the force urging the strap 12 against the wear ring 50. Such an arrangement is operative and even preferred, however, because maintenance of contact between the strap 12 and the wear ring 50 reduces the risk that the strap 12 will rotate about the head 15 of the bolt 14 such that the clamping portion 60 of the strap 12 will no longer extend into the recess 105.

It should be appreciated that the arrangement of the lever arm 30 in the restraining mechanism 10 is highly advantageous. Because the first distance between the pivot portion 38 and the handle portion 32 of the lever arm 30 is about forty times greater than the second distance between the pivot portion 38 and the contact portion 34, the lever arm 30 provides a mechanical advantage of about 40. While the contact portion 34 moves only 0.015–0.020 (0.04 cm to 0.05 cm) inches, the handle portion moves about one inch. This mechanical advantage allows an operator to release the large compressive force of the spring 26 from the strap 12 with the application of only a very small amount of force to the handle portion 32. The restraining mechanism 10 thus automatically provides a very large restraining force, but it can be released by a very small releasing force supplied by an operator.

The principles, a preferred embodiment and the mode of operation of the present invention have been described in the foregoing specification. However, the invention which is intended to be protected is not to be construed as limited to the particular embodiment disclosed. The embodiment is therefore to be regarded as illustrative rather than restrictive. Variations and changes may be made by others without departing from the spirit of the present invention. Accordingly, it is expressly intended that all such equivalents, variations and changes which fall within the spirit and scope of the present invention as defined in the claims be embraced thereby.

What is claimed is:

1. A restraining mechanism for use with an adjustable work table for releasably restraining movement of a movable member of the table relative to a stationary member of the table, the restraining mechanism comprising:

clamping means connected to one of the movable and stationary members;

spring means, connected to said clamping means, for forcing said clamping means against the other of the movable and stationary members and thereby restraining movement of the movable member relative to the stationary member;

pivot means attached to one of the movable and stationary members; and lever arm means, pivotably cooperating with said pivot means, for contacting said clamping means during pivotal motion of said lever arm means and thereby operating against the bias of said spring means to reduce the force applied through said clamping means to the other of the movable and stationary members, to allow movement of the movable member relative to the stationary member, said lever arm means including a handle portion, a pivot portion and a contact portion, said lever arm means pivotally cooperating with said pivot means at said pivot portion and contacting said clamping means at said contact portion, said pivot portion being intermediate said contact portion and said handle portion.

2. A restraining mechanism as claimed in claim 1 wherein first distance between said pivot portion and said handle portion is about forty times greater than a second distance between said pivot portion and said contact portion.

3. A restraining mechanism for use with an adjustable work table for releasably restraining movement of a movable member of the table relative to a stationary member of the table, the restraining mechanism comprising:

clamping means connected to one of the movable and stationary members;

spring means, connected to said clamping means, for forcing said clamping means against the other of the movable and stationary members and thereby restraining movement of the movable member relative to the stationary member;

pivot means attached to one of the movable and stationary members, said pivot means including a pivot projection; and lever arm means, resting against said pivot projection to pivotably cooperate with said pivot means, for contacting said clamping means during pivotal motion of said lever arm means and thereby operating against the bias of said spring means to reduce the force applied through said clamping means to the other of the movable and stationary members, to allow movement of the movable member relative to the stationary member.

4. A restraining mechanism as claimed in claim 2, wherein said spring means exerts a force of between about 350 and 500 pounds on said clamping means.

5. A restraining mechanism for use with an adjustable work table for releasably restraining movement of a movable member of the table relative to a stationary member of the table, the restraining mechanism comprising:

clamping means connected to one of the movable and stationary members, said clamping means including a strap to contact and clamp the other of the movable and stationary members, a bolt, and a clamping nut, said strap being held on said bolt adjacent a head of said bolt and said clamping nut being threadedly attached to said bolt spaced apart from said strap, said clamping nut being slidably held by one of the movable and stationary members;

spring means, connected to said clamping means, for forcing said clamping means against the other of the movable and stationary members and thereby restraining movement of the movable member relative to the stationary member, said spring means being in contact with said clamping nut;

pivot means attached to one of the movable and stationary members; and lever arm means, pivotably cooperating with said pivot means, for contacting said clamping means during pivotal motion of said lever arm means and thereby operating against the bias of said spring means to reduce the force applied through said clamping means to the other of the movable and stationary members, to allow movement of the movable member relative to the stationary member.

6. A restraining mechanism as claimed in claim 5, wherein said spring means is a coil spring extending around a portion of said bolt in compression between said clamping nut and the one of the movable and stationary members.

7. A restraining mechanism as claimed in claim 5, wherein said clamping means further includes a contact nut and a contact washer on said bolt spaced from said strap and from said clamping nut, one face of said contact washer being in contact with said lever arm means.

8. A restraining mechanism for an adjustable tool table for releasably restraining movement of a movable member of the table relative to a stationary member of the table, the restraining mechanism comprising:

clamping means connected to one of the movable and stationary members;

spring means, connected to said clamping means, for forcing said clamping means against the other of the movable and stationary members and thereby restraining movement of the movable member relative to the stationary member;

pivot means attached to one of the movable and stationary members; and lever arm means, pivotably cooperating with said pivot means, for contacting said clamping means during pivotal motion of said lever arm means and thereby operating against the bias of said spring means to reduce the force applied through said clamping means to the other of the movable and stationary members, to allow movement of the movable member relative to the stationary member, said lever arm means including a handle portion, a pivot portion and a contact portion, said lever arm means pivotally cooperating with said pivot means at said pivot portion and contacting said clamping means at said contact portion, said pivot portion being intermediate said contact portion and said handle portion.

9. A restraining mechanism as claimed in claim 4, wherein a first distance between said pivot portion and said handle portion is about forty times greater than a second distance between said pivot portion and said contact portion.

10. A restraining mechanism for an adjustable tool table for releasably restraining movement of a movable member of the table relative to a stationary member of the table, the restraining mechanism comprising:

clamping means connected to one of the movable and stationary members;

spring means, connected to said clamping means, for forcing said clamping means against the other of the movable and stationary members and thereby restraining movement of the movable member relative to the stationary member;

pivot means attached to one of the movable and stationary members and including a pivot projection; and lever arm means, resting against said pivot projection to pivotally cooperate with said pivot means, for contacting said clamping means during pivotal motion of said lever arm means and thereby operating against the bias of said spring means to reduce the force applied through said clamping means to the other of the movable and stationary members, to allow movement of the movable member relative to the stationary member.

11. A restraining mechanism as claimed in claim 8, wherein said spring means exerts a force of between about 350 and 500 pounds on said clamping means.

12. A restraining mechanism for an adjustable tool table for releasably restraining movement of a movable member of the table relative to a stationary member of the table, the restraining mechanism comprising:

clamping means connected to one of the movable and stationary members, said clamping means including a strap to contact and clamp the other of the movable and stationary members, a bolt, and a clamping nut, said strap being held on said bolt adjacent a head of said bolt and said clamping nut being threadedly attached to said bolt spaced from said strap, said clamping nut being slidably held by the one of the movable and stationary members;

spring means, connected to said clamping means, for forcing said clamping means against the other of the movable and stationary members and thereby restraining movement of the movable member relative to the stationary member, said spring means being in contact with said clamping nut;

pivot means attached to one of the movable and stationary members; and lever arm means, pivotably cooperating with said pivot means, for contacting said clamping means during pivotal motion of said lever arm means and thereby operating against the bias of said spring means to reduce the force applied through said clamping means to the other of the movable and stationary members, to allow movement of the movable member relative to the stationary member.

13. A restraining mechanism as claimed in claim 12, wherein said spring means is a coil spring extending around a portion of said bolt in compression between said clamping nut and the one of the movable and stationary members.

14. A restraining mechanism as claimed in claim 12, wherein said clamping means further includes a contact nut and a contact washer on said bolt spaced from said strap and from; said clamping nut, one face of said contact washer being in contact with said lever arm means.

15. An adjustable table, comprising:

base means;

table means, said base and table means being movable relative to each other;

clamping means connected to one of said base and table means, said clamping means including a clamping portion and a contact portion;

spring means in contact with said clamping means for forcing said clamping means against the other of said base and table means, to thereby restrain relative movement between said base and table means;

pivot means attached to said one of said base and table means; and lever arm means pivotably cooperating with said pivot means, for contacting said clamping means contact portion during pivotal motion of said lever arm means and thereby operating against the bias of said spring means to reduce the force applied through said clamping means to said other of said base and table means, to allow relative movement between said base and table means.

16. An adjustable table as claimed in claim 15, wherein said lever arm means further includes a handle portion, said lever arm means pivotally cooperating with said pivot means at a pivot portion and contacting said clamping means at a contact portion, said pivot portion being intermediate said contact portion and said handle portion.

17. An adjustable table as claimed in claim 16, wherein a first distance between said pivot portion and said handle portion is about forty times greater than a second distance between said pivot portion and said lever arm contact portion.

18. An adjustable table as claimed in claim 15, wherein said pivot means includes a pivot projection, said lever arm means resting against said pivot projection to pivotally cooperate therewith.

19. An adjustable table as claimed in claim 15, wherein said spring means exerts a force of between about 350 and 500 pounds on said clamping means.

20. An adjustable table as claimed in claim 15, wherein said clamping means includes a strap to contact and clamp said other of said base and table means, a bolt, and a clamping nut, said strap being held on said bolt adjacent a head of said bolt and said clamping nut being threadably attached to said bolt spaced from said strap, said clamping nut being slidably held by said one of said base and table means and being in contact with said spring means.

21. An adjustable table as claimed in claim 20, wherein said spring means extends around a portion of said bolt and is in compression between said clamping nut and said one of said base and table means.

22. An adjustable table as claimed in claim 20, wherein said clamping means further includes a contact nut and a contact washer on said bolt spaced from said strap and from said clamping nut, one face of said contact washer being in contact with said lever arm means.

23. An adjustable table as claimed in claim 15, further including:

spring-biased detent means located on said one of said base and table means; and a plurality of recesses located on said other of said base and table means in predetermined locations, said detent means being spring-biased into said recesses at predetermined positions of said base and table means relative to each other.

24. A restraining mechanism for use with an adjustable table for releasably restraining movement of a movable member of the table relative to a stationary member of the table, the restraining mechanism comprising:

clamping means connected to one of the movable and stationary members;

spring means, connected to said clamping means, for forcing said clamping means against the other of the movable and stationary members and thereby restraining movement of the movable member relative to the stationary member;

pivot means attached to one of the movable and stationary members; and lever arm means, distinct from said clamping means and pivotably cooperating with said pivot means, for contacting said clamping means during pivotal motion of said lever arm means and thereby operating against the bias of said spring means to reduce the force applied through said clamping means to the other of the movable and stationary members, to allow movement of the movable member relative to the stationary member.

25. The restraining mechanism as claimed in claim 24, wherein the adjustable table is selected from an adjustable work table and an adjustable tool table.

* * * * *